US011315599B2

(12) United States Patent
Nashida et al.

(10) Patent No.: US 11,315,599 B2
(45) Date of Patent: Apr. 26, 2022

(54) INFORMATION PROCESSING DEVICE AND INFORMATION PROCESSING METHOD

(71) Applicant: SONY CORPORATION, Tokyo (JP)

(72) Inventors: Tatsushi Nashida, Kanagawa (JP); Masanori Mikami, Kanagawa (JP); Kouta Minamizawa, Tokyo (JP); Masahiko Inami, Tokyo (JP); Tadatoshi Kurogi, Tokyo (JP); Minato Takeda, Tokyo (JP); Kazuya Yanagihara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/040,508

(22) PCT Filed: Mar. 7, 2019

(86) PCT No.: PCT/JP2019/008979
§ 371 (c)(1),
(2) Date: Sep. 22, 2020

(87) PCT Pub. No.: WO2019/188076
PCT Pub. Date: Oct. 3, 2019

(65) Prior Publication Data
US 2021/0012807 A1 Jan. 14, 2021

(30) Foreign Application Priority Data

Mar. 30, 2018 (JP) .............. JP2018-066735

(51) Int. Cl.
G11B 27/00 (2006.01)
G06F 3/01 (2006.01)
(Continued)

(52) U.S. Cl.
CPC ............ *G11B 27/007* (2013.01); *G06F 3/011* (2013.01); *G06K 9/00335* (2013.01); *G09B 19/003* (2013.01)

(58) Field of Classification Search
CPC .................................................. G11B 27/007
(Continued)

(56) References Cited

U.S. PATENT DOCUMENTS

2015/0099252 A1* 4/2015 Anderson ............. G06T 7/0014
434/257

FOREIGN PATENT DOCUMENTS

EP 3226229 A1 10/2017
JP 2006-030513 A 2/2006
(Continued)

OTHER PUBLICATIONS

International Search Report and Written Opinion of PCT Application No. PCT/JP2019/008979, dated May 14, 2019, 12 pages of ISRWO.

(Continued)

*Primary Examiner* — Daniel T Tekle
(74) *Attorney, Agent, or Firm* — Chip Law Group

(57) ABSTRACT

An information processing device including a mode control unit that determines a replay mode from replay mode candidates including a user dependent mode where output and replay are performed dependently on a user's action and a user independent mode where output and replay are performed independently of the user's action, and a output control unit that controls output and replay of an image, based on the replay mode.

19 Claims, 10 Drawing Sheets

(51) Int. Cl.
*G06K 9/00* (2022.01)
*G09B 19/00* (2006.01)
(58) Field of Classification Search
USPC ........................................................ 386/343
See application file for complete search history.

(56) References Cited

FOREIGN PATENT DOCUMENTS

| | | |
|---|---|---|
| JP | 2007-026090 A | 2/2007 |
| JP | 2009-045245 A | 3/2009 |
| JP | 2009-136606 A | 6/2009 |
| JP | 2009-213782 A | 9/2009 |
| JP | 2013-146511 A | 8/2013 |
| JP | 2014-217627 A | 11/2014 |
| JP | 2015-132678 A | 7/2015 |
| JP | 2015-146642 A | 8/2015 |
| JP | 2016-025523 A | 2/2016 |
| JP | 2016-174637 A | 10/2016 |
| WO | 2017/030193 A1 | 2/2017 |

OTHER PUBLICATIONS

Mikami, et al., "A Video Feedback System Providing Motions Synchronized with Reference Examples for Motor Learning", IPSJ Translations (CDS), vol. 4, No. 1, Apr. 23, 2014, pp. 22-31.

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/008979 filed on Mar. 7, 2019, which claims priority benefit of Japanese Patent Application No. JP 2018-066735 filed in the Japan Patent Office on Mar. 30, 2018. Each of the above-referenced applications is hereby incorporated herein by reference in its entirety.

FIELD

The present disclosure relates to an information processing device, an information processing method, and a program.

BACKGROUND

Replaying an image serving as a model for work and doing the work while watching the image, when doing the work, have become widely popular, the work being, for example, cooking or practice for a sport or musical instrument. Furthermore, a system has been disclosed in Patent Literature 1 cited below, the system being for display of a virtual object on a head mounted display worn by a user, the virtual object serving as a model for work, such as cooking.

CITATION LIST

Patent Literature

Patent Literature 1: International Publication Pamphlet No. WO 2017/030193

SUMMARY

Technical Problem

A scheme for enabling users to proceed with work more comfortably has thus been desired in the technology for presenting models for work to users.

Solution to Problem

According to the present disclosure, an information processing device is provided that includes: a mode control unit that determines a replay mode from replay mode candidates including: a user dependent mode where output and replay are performed dependently on a user's action; and a user independent mode where output and replay are performed independently of the user's action; and an output control unit that controls replay and output of an image, based on the replay mode.

Moreover, according to the present disclosure, an information processing method is provided that includes: determining a replay mode from replay mode candidates including: a user dependent mode where output and replay are performed dependently on a user's action; and a user independent mode where output and replay are performed independently of the user's action; and controlling output and replay of an image, based on the replay mode.

Moreover, according to the present disclosure, a program is provided that causes a computer to implement: a function of determining a replay mode from replay mode candidates including: a user dependent mode where replay and output are performed dependently on a user's action; and a user independent mode where replay and output are performed independently of the user's action; and a function of controlling output and replay of an image, based on the replay mode.

Advantageous Effects of Invention

As described above, according to the present disclosure, in the technology for presenting images serving as models for work to users, users are able to proceed with work more comfortably.

The above effect is not necessarily limiting, and together with the effect, or instead of the effect, any of effects disclosed in this specification or any other effect that is able to be perceived from this specification may be achieved.

DESCRIPTION OF EMBODIMENTS

Figure 1:
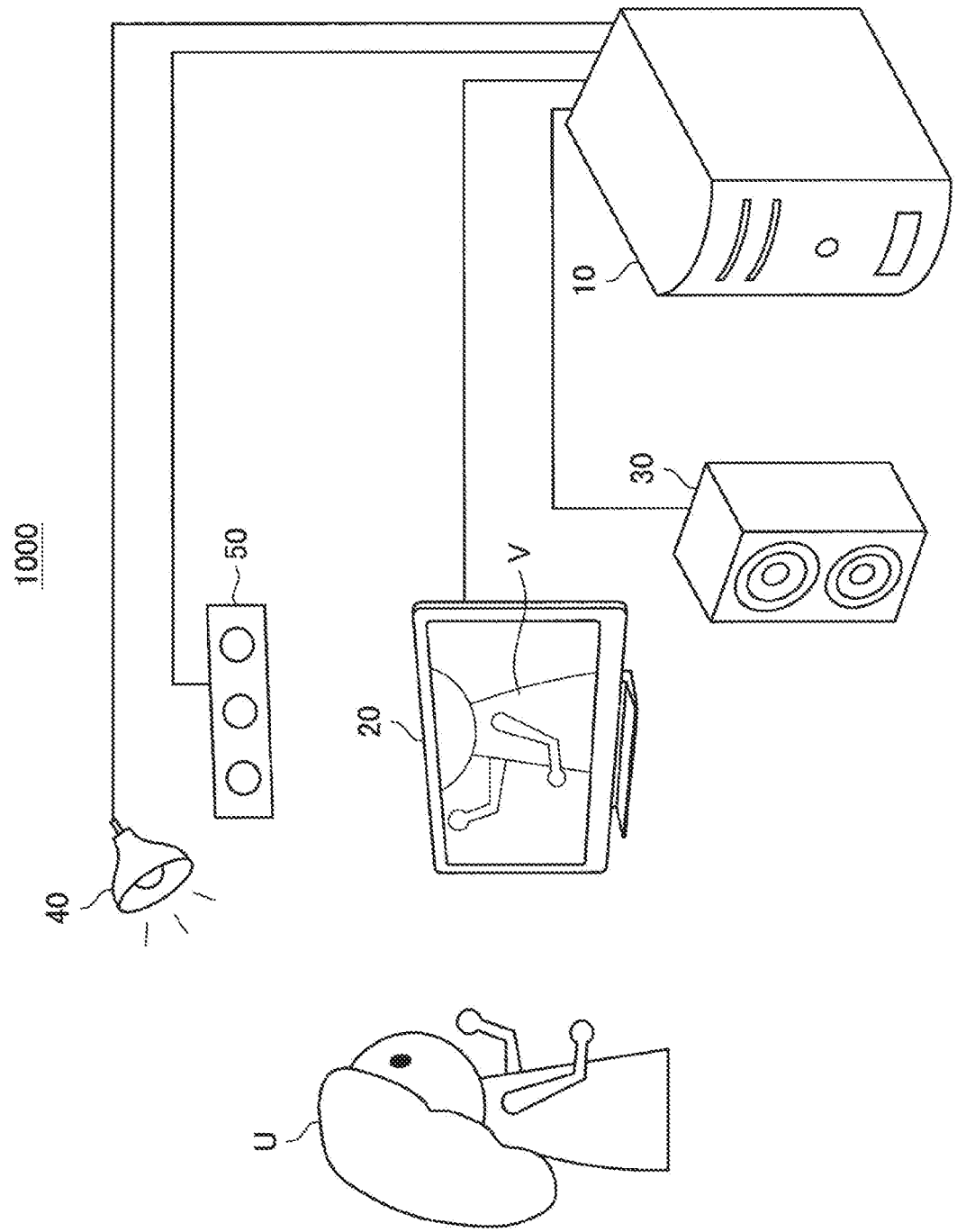
FIG. 1 is an explanatory diagram for explanation of an outline of a display system 1000 according to an embodiment of the present disclosure.

A preferred embodiment of the present disclosure will hereinafter be described in detail, while reference is made to the appended drawings. Redundant explanation will be omitted by assignment of the same reference sign to any components having substantially the same functional configuration, throughout the specification and drawings.

Furthermore, plural components having substantially the same functional configuration may be distinguished from one another by addition of different alphabets after the same reference sign, throughout the specification and drawings. However, if plural components having substantially the same functional configuration do not need to be particularly distinguished from one another, only the same reference sign will be assigned to these components.

Description will be made in the following order.
1. Introduction
1-1. Background
1-2. Outline
2. Configuration of Information Processing Device
3. Operation of Information Processing Device
3-1. Flow of Processing
3-2. Specific Example
4. Modified Examples
4-1. First Modified Example
4-2. Second Modified Example
4-3. Third Modified Example
4-4. Fourth Modified Example
5. Example of Hardware Configuration
6. Conclusion

1. INTRODUCTION 1-1. Background

Replaying an image (which may hereinafter be referred to as a model image) serving as a model for work and doing the work while watching the image, when doing the work, have become widely popular, the work being, for example, cooking or practice for a sport or musical instrument. According to the present disclosure, an image is used as a term meaning, not only a still image, but also a moving image.

In a state where a user is doing work while watching a model image as mentioned above, the user may want to perform an operation related to replay of the model image. Examples of such a case include: a case where work in a model image has already proceeded to work that is ahead of work that a user is currently doing; a case opposite to this case; and a case where a user wants to replay a model image at a speed different from a currently set speed.

When an existing display device or a display system is used, a user needs to perform an action unrelated to work being done by the user, to perform such an operation, the action being, for example, touching a touch panel, a mouse, a keyboard, or the like, or making a gesture. As a result, the work being done by the user is interrupted and it may become difficult for the user to proceed with the work comfortably. Furthermore, if the user has foodstuffs or seasonings on the user's hands in cooking, for example, touching the touch panel, mouse, keyboard, or the like is even more inconvenient for the user.

Furthermore, an operation may be performed through voice by use of speech recognition technology, but the recognition accuracy is affected by the surrounding environment and there is thus a risk of misrecognition. In particular, in a case where sound is generated by work done by a user like in practice for a musical instrument, for example, the work still needs to be interrupted for recognition of voice for an operation, and it may be difficult for the user to proceed with the work comfortably.

An embodiment of the present disclosure has been invented based on a perspective in view of the above described circumstances. A display system according to the embodiment of the present disclosure recognizes a user's action related to work being done by the user, controls output and replay (display) of a model image dependently on the action, and thereby enables output and replay that allow the user to proceed with the work more comfortably. Hereinafter, an outline of this display system according to the embodiment of the present disclosure will be described by reference to FIG. 1.

1-2. Outline

FIG. 1 is an explanatory diagram for explanation of an outline of a display system 1000 according to the embodiment of the present disclosure. As illustrated in FIG. 1, the display system 1000 according to the embodiment is an information processing system including an information processing device 10, a display device 20, a speaker 30, a lighting device 40, and a sensor device 50. The display system 1000 may be used for, for example, a user U illustrated in FIG. 1 to do work, such as cooking or practice for a sport or a musical instrument, with a model image V serving as a model, the model image V being displayed on the display device 20.

The information processing device 10 controls the overall display system 1000. For example, the information processing device 10 may control: output and replay (display) by the display device 20; output and replay of sound by the speaker 30; and an on state (lit state) and an off state (unlit state) of the lighting device 40.

Furthermore, based on sensing by the sensor device 50, the information processing device 10 may recognize the user U's action, and control output and replay of the model image V displayed by the display device 20 and sound by the speaker 30, dependently on the action. The recognized action of the user U is desirably an action related to work done by the user U. If the work done by the user U is cooking, for example, the action related to the work done by the user U may be an action having some meaning in that work, such as cutting foodstuffs or frying foodstuffs. This configuration eliminates the user U's need to perform an action unrelated to the work done by the user U (for example, a gesture) for an operation, and thus enables the user U to proceed with the work more comfortably.

Furthermore, the information processing device 10 may determine a replay mode from replay mode candidates including: a user dependent mode where output and replay are performed dependently on the user U's action; and a user independent mode where output and replay are performed independently of the user U's action. Based on the replay mode, the information processing device 10 may control output and replay of the model image V displayed on the display device 20 and sound by the speaker 30, and notify a user of the current replay mode by controlling, for example, the lighting device 40, according to the replay mode. This configuration enables the user U to proceed with work while knowing the current replay mode and thus to proceed with the work more comfortably.

Figure 2:
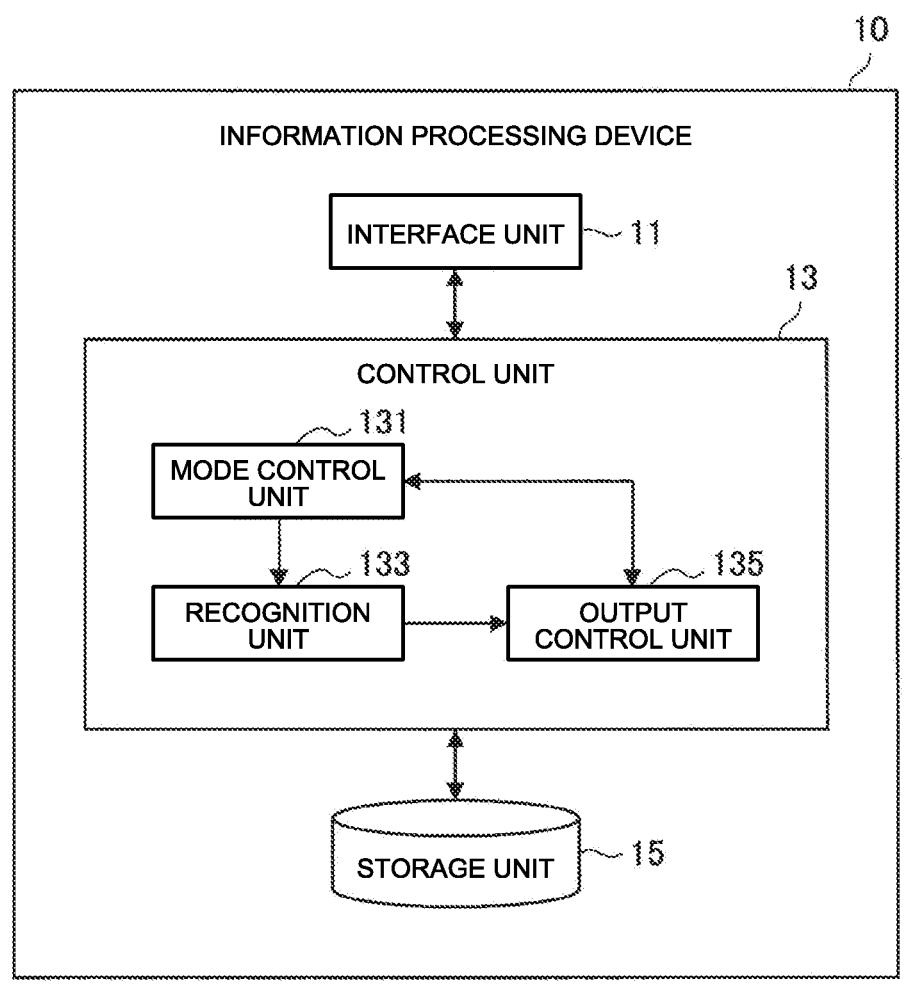
FIG. 2 is a block diagram illustrating an example of a configuration of an information processing device 10 according to the same embodiment.

A more detailed configuration of the information processing device 10 will be described later by reference to FIG. 2.

According to control by the information processing device 10, the display device 20 outputs and replays (displays) the model image V. According to this embodiment, the display device 20 is regarded as a mirror for the user U. The display device 20 is desirably configured such that the user U feels as if a person (hereinafter, referred to as a teacher) who performs an action serving as a model in the model image V displayed on the display device 20 is a mirror image of herself (the user U) reflected in the mirror. The display device 20 may have, for example, a size that enables, for example, the teacher in the model image V to be displayed life-sized, and be placed oppositely to the user U.

By the user U feeling as if a teacher in the model image V is a mirror image of the user U herself, the user U will move unconsciously according to a motion of the teacher in the model image V when the teacher in the model image V starts the motion, for example, and the user U is expected to be able to proceed with the work more comfortably.

In addition to the display device 20 being configured as described above, the model image V displayed on the display device 20 is desirably an image that causes the user U to feel as if a teacher in the model image V is a mirror image of herself (the user U) reflected in a mirror. For example, the dominant hand of the teacher in the model image V may be a hand that is right and left reversed from the dominant hand of the user U. By this model image V being displayed, it becomes easier for the user U to copy the teacher's action and to feel as if the teacher is a mirror image of the user U herself. Furthermore, display of a face region of the teacher may cause the user U to feel as if the teacher is a person different from the user U herself, and the face region of the teacher is thus desirably not included in the model image V displayed on the display device 20. This configuration enables the user U to feel as if the teacher is a mirror image of the user U herself eve more.

According to control by the information processing device 10, the speaker 30 outputs and replays sound. For example, a sound signal associated with the model image V may be supplied from the information processing device 10 to the speaker 30 and the speaker 30 may output and replay sound, based on the sound signal.

The lighting device 40 is switched on or off, according to control by the information processing device 10. For example, while the replay mode is the user dependent mode, the lighting device 40 may be switched on, and while the replay mode is the user independent mode, the lighting device 40 may be switched off. The disclosed techniques are not limited to this example. A user may be notified of the current replay mode by a method not using the lighting device 40, and may be notified, for example, by output of sound from the speaker 30.

The sensor device 50 provides sensor information that the sensor device 50 has acquired by sensing the user U and an environment surrounding the user U, to the information processing device 10. For the information processing device 10 to recognize the user U's action, the sensor device 50 acquires, for example, sensor information related to the action of the user U, by sensing. For the sensor device 50 to acquire the sensor information related to the action of the user U, a marker may be attached to the user U or a utensil (for example, a cooking utensil or a musical instrument) supported by the user U. However, the method used by the sensor device 50 to acquire the sensor information related to the action of the user U is not limited to this example, and various motion sensor techniques may be used. For example, a sensor device, such as an acceleration sensor, may be incorporated in the utensil supported by the user U for the sensor information related to the action of the user U to be acquired. Or, the sensor device 50 may include a camera, the sensor device may include an image acquired by imaging through the camera, and the information processing device 10 may be able to recognize the user U's action, based on the image without needing a marker or an acceleration sensor.

Furthermore, the sensor information that is able to be acquired by the sensor device 50 is not limited to the above example, and the sensor device 50 may be able to acquire more versatile sensor information. For example, the sensor device 50 may be able to acquire sensor information related to the user U's position or sensor information related to the user U's line of sight.

2. EXAMPLE OF CONFIGURATION

The outline of the display system 1000 according to the embodiment has been described above. Next, an example of a configuration of the information processing device 10 according to the embodiment and illustrated in FIG. 1 will be described in detail by reference to FIG. 2. FIG. 2 is a block diagram illustrating the example of the configuration of the information processing device 10 according to the embodiment. As illustrated in FIG. 2, the information processing device 10 according to the embodiment includes an interface unit 11, a control unit 13, and a storage unit 15.

The interface unit 11 is an interface for connecting between the information processing device 10 and an external device (for example, the display device 20, the speaker 30, the lighting device 40, or the sensor device 50, illustrated in FIG. 1) or a network not illustrated in the drawings. The interface unit 11 provides information received from the external device or the network not illustrated in the drawings, to the control unit 13, and transmits information (including control information or the like) provided from the control unit 13, to the external device or the network not illustrated in the drawings.

The control unit 13 controls each component of the information processing device 10. Furthermore, the control unit 13 functions, as illustrated in FIG. 2, as a mode control unit 131, a recognition unit 133, and an output control unit 135.

The mode control unit 131 determines a replay mode related to output and replay by the output control unit 135 described later. The mode control unit 131 may determine the replay mode from the replay mode candidates that have been prepared beforehand, and the replay mode candidates may include: the user dependent mode where output and replay are performed dependently on the user U's action; and the user independent mode where output and replay are performed independently of the user U's action. In an example described hereinafter, the mode control unit 131 determines the replay mode such that the replay mode is switched over between the user dependent mode and the user independent mode, but without being limited to this example, the replay mode candidates may include any other mode.

The mode control unit 131 may receive, from the output control unit 135 described later, information on a current frame from the model image V, and change the replay mode according to the current frame. The mode control unit 131 may determine the replay mode such that the replay mode is switched over from the user independent mode to the user dependent mode when the current frame has reached a predetermined scene in the model image V. Furthermore, the mode control unit 131 may determine the replay mode such that the replay mode is switched from the user dependent mode to the user independent mode when replay of the predetermined scene has ended.

The predetermined scene may be a scene that the user U should pay more attention to, or a scene related to a process that requires higher skill in work being done by the user U, in the model image V. This configuration enables the user U to proceed with the work more comfortably because the model image V is output and replayed dependently on the user U's action as described later for a scene that the user U should pay attention to.

In the model image V, the scene that the user U should pay more attention or the scene related to the process that requires higher skill in work being done by the user U may differ depending on, for example, the type of work related to the model image V, that is, the type of work done by the user U. For example, if the work done by the user U is cooking, the user U does not to need to pay much attention to an action of washing foodstuffs and an action of mixing the foodstuffs and these actions are considered to not require higher skill, as compared to an action of cutting the foodstuffs and an action of frying the foodstuffs with a frying pan. Therefore, the mode control unit 131 may determine the replay mode to be the user independent mode for a scene of the action of washing foodstuffs or the action of mixing the foodstuffs, and determine the replay mode to be the user independent mode for a scene of the action of cutting the foodstuffs and the action of frying the foodstuffs with the frying pan.

To change the replay mode as described above, the mode control unit 131 may determine the replay mode based on mode control information. As described above, the predetermined scene, such as the scene that the user U should pay more attention to or the scene related to the process that requires higher skill in the work done by the user U may differ depending on the type of work done by the user U. Therefore, the mode control information may be associated with the model image V beforehand and stored in the storage unit 15, and the mode control unit 131 may determine the replay mode by referring to a piece of mode control information associated with the current frame.

For example, mode control information indicating that a start frame and an end frame of a predetermined scene, which is in the model image V and should be determined to be in the user dependent mode, are respectively a start frame and an end frame of the predetermined scene may be associated with the start frame and the end frame of the predetermined scene. If the mode control information indicating that the current frame is the start frame of the predetermined scene has been associated with the current frame, the mode control unit 131 may determine the replay mode such that the replay mode is switched from the user independent mode to the user dependent mode. Furthermore, similarly, if the mode control information indicating that the current frame is the end frame of the predetermined scene has been associated with the current frame, the mode control unit 131 may determine the replay mode such that the replay mode is switched from the user dependent mode to the user independent mode.

Or, mode control information indicating whether each frame in the model image V corresponds to the user dependent mode or the user independent mode may be associated with the frame. In this case also, the mode control unit 131 may refer to the mode control information associated with the current frame and determine the replay mode.

The disclosed techniques are not limited to the examples described above, and the mode control unit 131 may analyze the model image V and determine the replay mode. For example, by using a discriminator obtained by machine learning using a large number of images, the mode control unit 131 may analyze the model image V and determine the replay mode. Furthermore, similarly, by analysis of the model image V, the mode control information may be generated beforehand.

The mode control unit 131 provides information on the determined replay mode, to the recognition unit 133 and the output control unit 135.

The recognition unit 133 performs recognition related to the user U, based on sensor information acquired via the interface unit 11 from the sensor device 50 described by reference to FIG. 1. For example, based on the sensor information, the recognition unit 133 may recognize the user U's action. The type of the action recognized by the recognition unit 133 may be determined beforehand according to, for example, the model image V. For example, if the model image V is an image serving as a model for cooking, the recognition unit 133 may recognize an action of cutting foodstuffs or an action of frying the foodstuffs with a frying pan.

Furthermore, the user U's action recognized by the recognition unit 133 is desirably an action related to work done by the user U, as described above. For example, the user U's action recognized by the recognition unit 133 may be any of actions of a teacher in the model image V. Information related to the actions of the teacher (which may hereinafter be called taught action information) may be stored in the storage unit 15 described later, and the recognition unit 133 may recognize an action of the same type as that of the teacher's action, based on the taught action information.

The recognition unit 133 provides information on the recognized action of the user U, to the output control unit 135. As described later, the information on the user U's action provided from the recognition unit 133 is used by the output control unit 135 when the replay mode is the user dependent mode. The recognition unit 133 may perform recognition of the user U's action according to the replay mode, and for example, may perform recognition of the user U's action only when the replay mode is the user independent mode and not perform recognition of the user U's action when the replay mode is the user independent mode. This configuration enables the amount of processing to be reduced.

Furthermore, what is recognized by the recognition unit 133 is not limited to the user U's action, and the recognition unit 133 may recognize various types of information. Other examples will be described as modified examples.

Based on the replay mode determined by the mode control unit 131, the output control unit 135 controls output and replay of the model image V by the display device 20 illustrated in FIG. 1. Furthermore, by outputting a sound signal associated with the model image V to the speaker 30 illustrated in FIG. 1 in synchronization with output and replay of the model image V, the output control unit 135 may control output and replay of sound.

When the replay mode is the user independent mode, the output control unit 135 controls output and replay of the model image V independently of the user U's action. For example, when the replay mode is the user independent mode, the output control unit 135 may output and replay the model image V, according to a preset frame rate. This configuration enables the user U to proceed with the work more comfortably, because for a scene of an action not requiring high skill, for example, the model image V is output and replayed smoothly.

On the contrary, if the replay mode is the user dependent mode, the output control unit 135 controls output and replay of the model image V, based on the taught action information related to the teacher's action in the model image and the user U's action recognized by the recognition unit 133. As described above, the taught action information related to the teacher's action may be stored, in association with the model image V, in the storage unit 15 described later. Furthermore, the taught action information may be information indicating the teacher's action in each frame, and may be associated with each frame of the model image V.

For example, when the replay mode is the user dependent mode, the output control unit 135 may pause output and replay of the model image V until a predetermined action is recognized by the recognition unit 133. When the replay mode is the user dependent mode and the predetermined action has been recognized by the recognition unit 133, the output control unit 135 may restart the output and replay of the model image V, based on the recognized predetermined action of the user U. This predetermined action may be, for example, an action performed by the teacher in the model image V. This configuration enables, for example, a scene to be prevented from being output and replayed even though the user U is not prepared to perform the predetermined action, the scene being where the teacher performs the predetermined action.

The method of outputting and replaying the model image V, based on a recognized action of the user U may be any of various methods. For example, the output control unit 135 may output and replay the model image V such the teacher's action and the user U's action are in synchronization with each other. This configuration enables the user U to feel as if the teacher is a mirror image of the user U herself even more.

Figure 3:
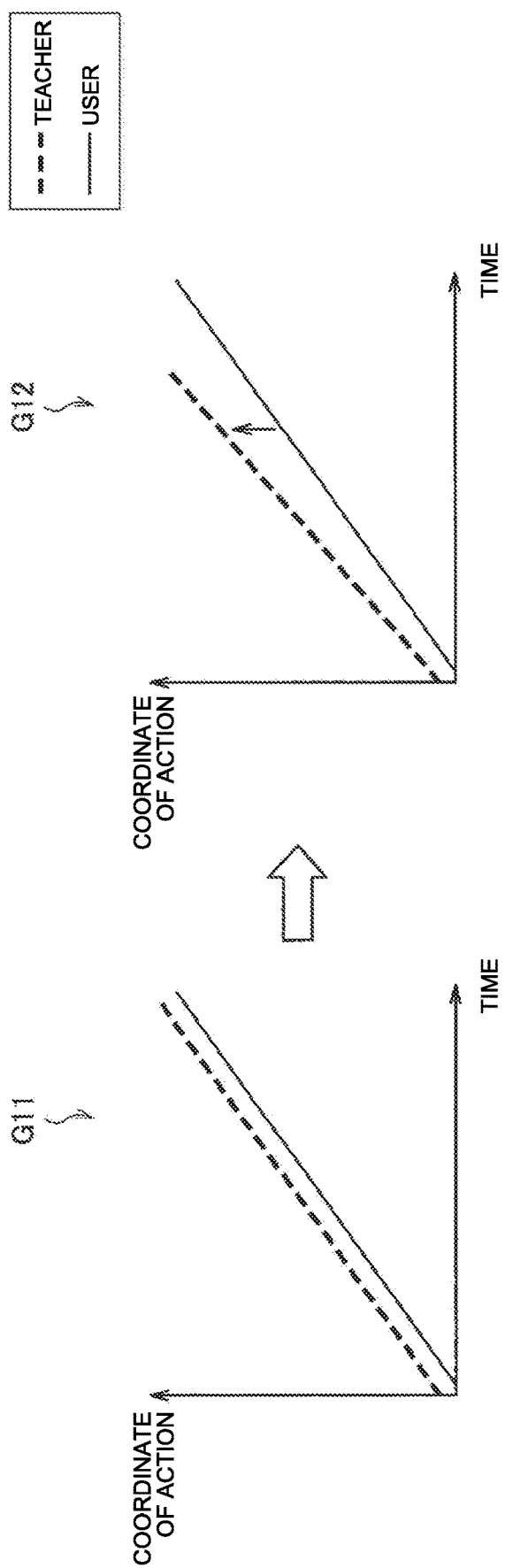
FIG. 3 is a diagram illustrating an example of a case where a model image V is output and replayed such that a teacher's action precedes a user U's action.
Figure 4:
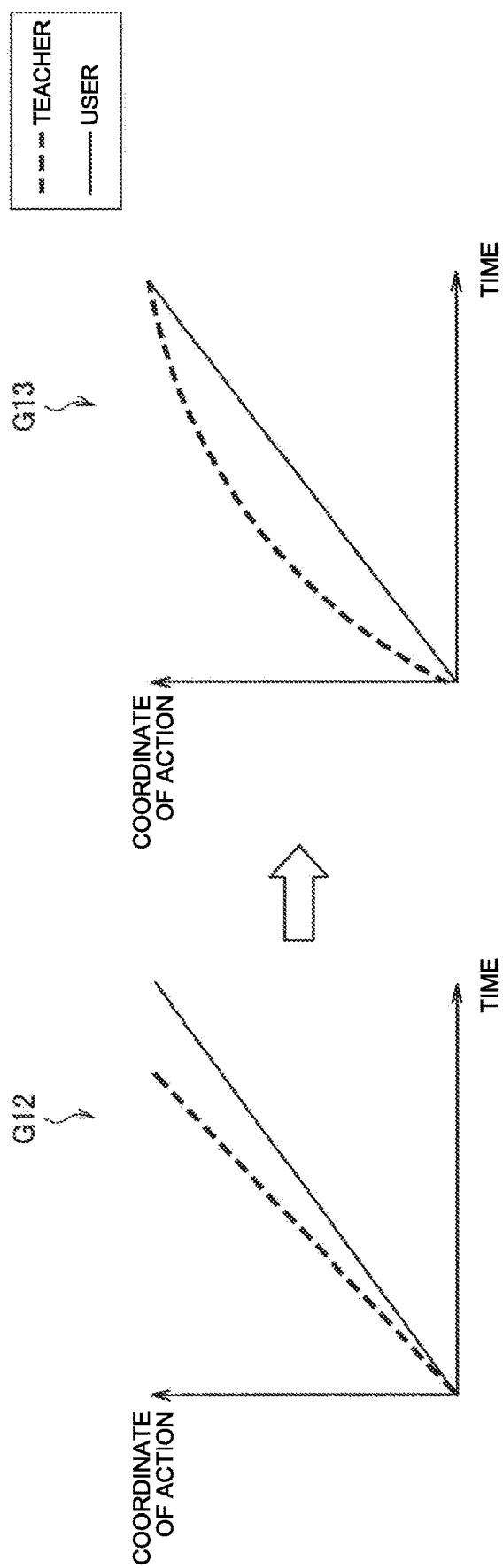
FIG. 4 is a diagram illustrating an example of the case where the model image V is output and replayed such that the teacher's action precedes the user U's action.

Or, the output control unit 135 may output and replay the model image V such that the teacher's action precedes the user U's action. Examples of a case will be described by reference to FIG. 3 and FIG. 4, the case being where the model image V is output and replayed such that the teacher's action precedes the user U's action. FIG. 3 and FIG. 4 are diagrams illustrating the examples of the case where the model image V is output and replayed such that the teacher's action precedes the user U's action.

In the example with a graph G11 illustrated in FIG. 3, the output control unit 135 outputs and replays the model image V such that the teacher's action precedes the user U's action by a given time period. This configuration enables, for example, the user U to perform the action by copying the action of the teacher and to proceed with work comfortably, while having a model that is the preceding action of the teacher.

In the example with a graph G12 illustrated in FIG. 3, the output control unit 135 outputs and replays the model image V such that the teacher's action precedes the user U's action more as time elapses. An expected effect according to this configuration is that the user U will feel the action to be lighter.

However, when output and replay are controlled like in the graph G12 illustrated in FIG. 3 for a scene where the same action is repeated, difference between the teacher's action and the user U's action is increased as the action is repeated and the user U may gradually feel oddness. Therefore, the output control unit 135 may, like in the example with a graph G13 illustrated in FIG. 4, output and replay the model image V such that the teacher's action and the user's action match each other at a starting point (a start time) and an end point (an end time) of the action. This configuration reduces the oddness felt by the user U, in particular for a scene where the same action is repeated.

Between the starting point and the end point of the action, the output control unit 135 may output and replay the model image V according to progress of the user U's action. For example, the output control unit 135 may output and replay the model image V such that the speed of the teacher's action corresponds to the speed of the user U's action. Furthermore, the output control unit 135 may rewind and then output and replay the model image V, such that if the direction of the user U's action is opposite to the direction of the proper action, the teacher's action will also be in the opposite direction. This configuration enables the user U to control output and replay according to progress of the user U's action.

Figure 5:
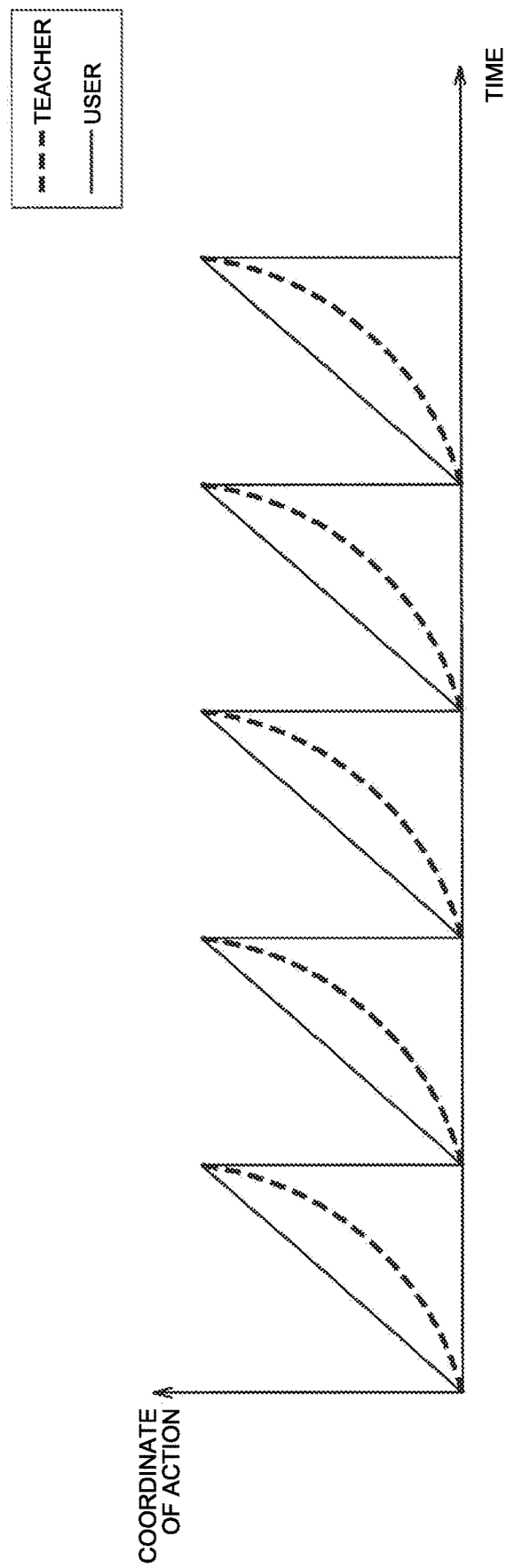
FIG. 5 is a diagram illustrating an example of a case where the model image V is output and replayed such that a teacher's action is delayed from the user U's action.

Furthermore, the output control unit 135 may output and replay the model image V such that the teacher's action is delayed from the user U's action. FIG. 5 is a diagram illustrating an example of a case where the model image V is output and replayed such that the teacher's action is delayed from the user U's action. An expected effect of output and replay of the model image V such that the teacher's action is delayed from the user U's action as illustrated in FIG. 5 is that the user U will feel the action to be heavier. According to this configuration, for example, when a training action, such as an action of lifting and lowering dumbbells, is performed, the effect of the training can be improved.

Figure 6:
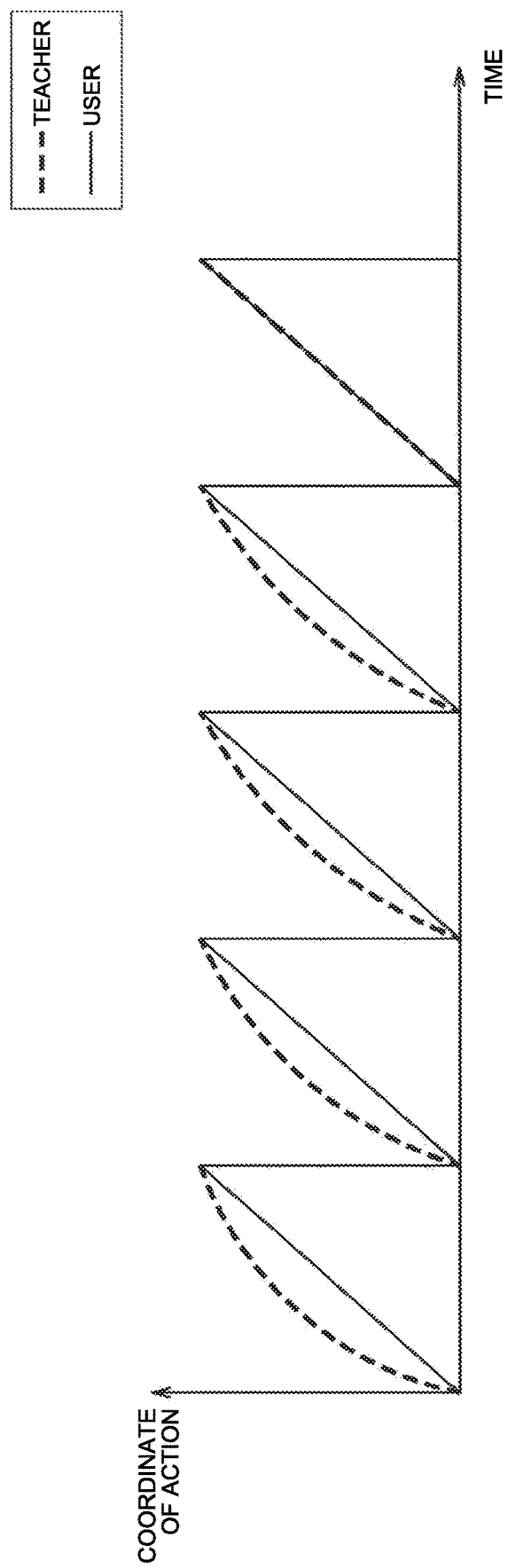
FIG. 6 is a diagram illustrating an example of a case where the model image V is output and replayed such that a temporal difference between a teacher's action and the user U's action is decreased every time the same action is repeated.

Furthermore, the output control unit 135 may output and replay the model image V such that the temporal difference between the teacher's action and the user U's action is decreased every time the same action is repeated. FIG. 6 is a diagram illustrating an example of a case where the model image V is output and replayed such that the temporal difference between the teacher's action and the user U's action is decreased every time the same action is repeated. In the example illustrated in FIG. 6, when the user U performs an action for the first time, the teacher's action precedes the action of the user U. Therefore, when output and replay are controlled as illustrated in FIG. 6, an expected effect is that when the user U performs an action for the first time, the user U feels the action to be lighter. Furthermore, because the temporal difference between the teacher's action and the user U's action is gradually decreased, an expected effect is that, for example, the user U is able to feel as if the user U has become able to perform the action more smoothly (better).

Similarly, even in a case where a teacher's action is delayed from the user U's action when the user U performs the action for the first time, output and replay may be controlled such that the temporal difference between the teacher's action and the user U's action is decreased every time the same action is repeated.

An example of a method of outputting and replaying the model image V, based on the recognized user U's action, has been described above. However, the embodiment is not limited to the example described above, and the output control unit 135 may output and replay the model image V variously, based on the recognized user U's action, when the replay mode is the user dependent mode.

Furthermore, the output control unit 135 may cause the user U to be notified of the current replay mode determined by the mode control unit 131. For example, by controlling the lighting device 40, the output control unit 135 may notify a user of the current replay mode. In this case, the output control unit 135 may switch the lighting device 40 on (into the lit state) when the current replay mode is the user dependent mode, and switch the lighting device 40 off (into the unlit state) when the current replay mode is the user independent mode. The method of notifying the user U is not limited to this example, and the output control unit 135 may notify the user U of the current replay mode through sound output from the speaker 30, for example.

Furthermore, the output control unit 135 provides information on the current frame (for example, a frame number) to the mode control unit 131.

The storage unit 15 stores therein programs and parameters for the components of the above described control unit 13 to function. For example, the storage unit 15 stores therein the model image V, a sound signal associated with the model image V, mode control information associated with the model image V, and taught action information associated with the model image V.

An example of the configuration of the information processing device 10 according to the embodiment has been described above by reference to FIG. 2, but the configuration of the information processing device 10 is not limited to the example illustrated in FIG. 2. For example, a part or all of functions of the control unit 13 illustrated in FIG. 2 may be implemented by another device connected via the interface unit 11. Furthermore, a part or all of the information described above as being stored in the storage unit 15 may be provided to the information processing device 10 from another device or a network connected via the interface unit 11.

3. OPERATION OF INFORMATION PROCESSING DEVICE 3-1. Flow of Processing

Figure 7:
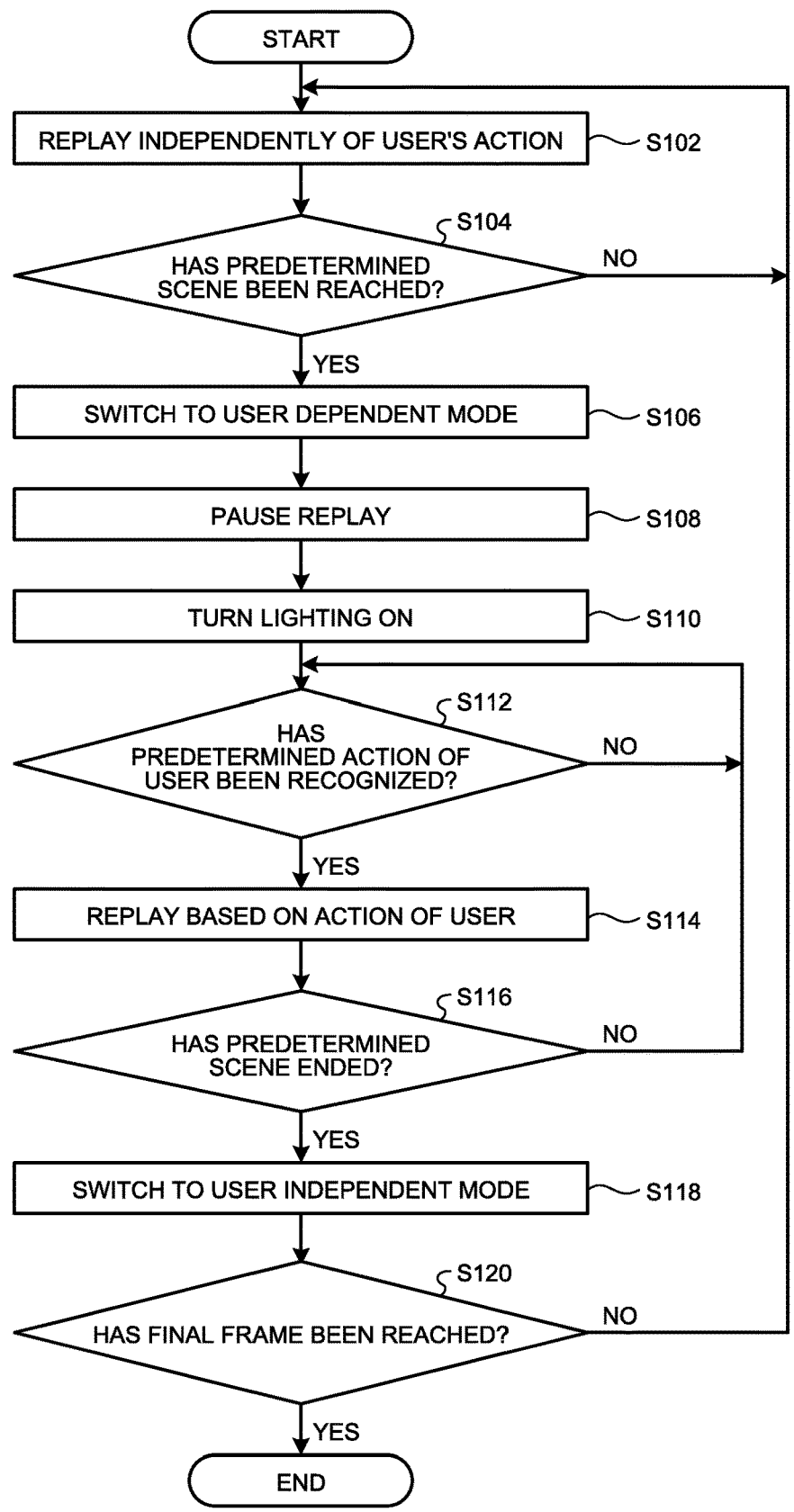
FIG. 7 is a flow chart illustrating an example of a flow of processing at the information processing device 10 according to the same embodiment.

Next, a flow of processing by the information processing device 10 according to this embodiment will be described by reference to FIG. 7. FIG. 7 is a flow chart illustrating an example of the flow of the processing by the information processing device 10 according to the embodiment. At the time of start of the processing in FIG. 7, the replay mode is assumed to be the user independent mode.

As illustrated in FIG. 7, firstly, the output control unit 135 causes the model image V to be output and replayed, independently of the user U's action (S102). Subsequently, the mode control unit 131 refers to mode control information associated with the current frame, and determines whether or not the current frame has reached a predetermined scene in the model image V (S104). If it is determined that the predetermined scene has not been reached (No at S104), the processing is returned to Step S102.

On the contrary, if it is determined that the predetermined scene has been reached (Yes at S104), the mode control unit 131 determines the replay mode such that the replay mode is switched from the user independent mode to the user dependent mode (S106). Subsequently, the output control unit 135 pauses the output and replay of the model image V according to the switch-over of the replay mode at Step S106 (S108), and notifies the user U of the replay mode by switching the lighting device 40 on (into the lit state) (S110).

Until the recognition unit 133 recognizes a predetermined action of the user U at Step S112, the processing at Step S112 is repeated with the output and replay of the model image V being paused.

If the recognition unit 133 recognizes the predetermined action of the user U (Yes at S112), the output control unit 135 restarts the output and replay of the model image V and causes the model image V to be output and replayed, based on the recognized action of the user U (S114). Subsequently, the mode control unit 131 refers to the mode control information associated with the current frame, and determines whether or not the predetermined scene in the model image V has ended (S116). If it is determined that the predetermined scene has not ended (No at S116), the processing is returned to Step S112.

On the contrary, if it is determined that the predetermined scene has ended (Yes at S116), the mode control unit 131 determines the replay mode such that the replay mode is switched from the user dependent mode to the user independent mode (S118). If the current frame has reached the final frame of the model image V (Yes at S120), the processing is ended. On the contrary, if the current frame has not reached the final frame of the model image V (No at S120), the processing is returned to Step S102.

3-2. Specific Example

Table 1 below is a table representing a specific example according to the embodiment. Table 1 represents a specific example of a case where the user U performs cooking. Furthermore, in Table 1 below, the scene numbers have been assigned for explanation, but no scene numbers may be assigned to the model image V for the processing according to the embodiment.

TABLE 1

Specific example according to embodiment of present invention

| Scene number | Action included in scene | Replay mode | Lighting |
|---|---|---|---|
| #1 | Put Chinese cabbage placed in tray, onto chopping board. | User independent mode | OFF |
| #2 | Hold kitchen knife and cut Chinese cabbage eight times. | User dependent mode | ON |
| #3 | Gather cut pieces of Chinese cabbage together and put them in tray. | User independent mode | OFF |
| #4 | Put pork already cut into pieces in frying pan. | User dependent mode | ON |
| #5 | Put pieces of Chinese cabbage in frying pan. | User independent mode | OFF |
| #6 | Hold container containing shio-kombu (salted dried strips of kelp) up and add adequate amount of it into frying pan. | User dependent mode | ON |
| #7 | Neaten with cooking chopsticks and toss frying pan four times. | User dependent mode | ON |
| #8 | Serve. | User independent mode | OFF |
| #9 | Complete. | User independent mode | OFF |

For example, for Scene #2 in Table 1, output and replay of a teacher's action of cutting Chinese cabbage with a cooking knife may be controlled to precede a user's action by a given time period. Furthermore, at Scene #4 in Table 1, a pause may be cancelled by a container containing pork being brought to a place where a container containing pork is in the model image V. In addition, at Scene #6 in Table 1, output and replay may be paused in a state where the teacher is holding a container containing shio-kombu (salted dried strips of kelp) up in the model image V, and the pause may be cancelled by the user U holding up a container containing shio-kombu in the same way as the teacher. What is more, at Scene #7, an action of tossing a frying pan once may be regarded as one action, and output and replay may be controlled such that the teacher's action and the user's action match each other at a starting point and an end point of the action of tossing the frying pan once.

Table 1 illustrates just one example, and without being limited to this example, the embodiment may be used for various scenes. For example, the embodiment may be applied, not only to cooking, but also to various kinds of work that a user is able to learn while watching a model, such as: practice for sports using the user's body, like dancing, karate, and physical exercises; and practice for musical instruments, such as guitars, wind instruments, and drums.

4. MODIFIED EXAMPLES

An embodiment of the present disclosure has been described above. Some modified examples of the embodiment of the present disclosure will be described below. The modified examples described below may be applied to the embodiment of the present disclosure alone or may be applied to the embodiment of the present disclosure in combination. Furthermore, each of the modified examples may be adopted instead of a configuration described with respect to the embodiment of the present disclosure, or may be adopted additionally to a configuration described with respect to the embodiment of the present disclosure.

4-1. First Modified Example

Figure 8:
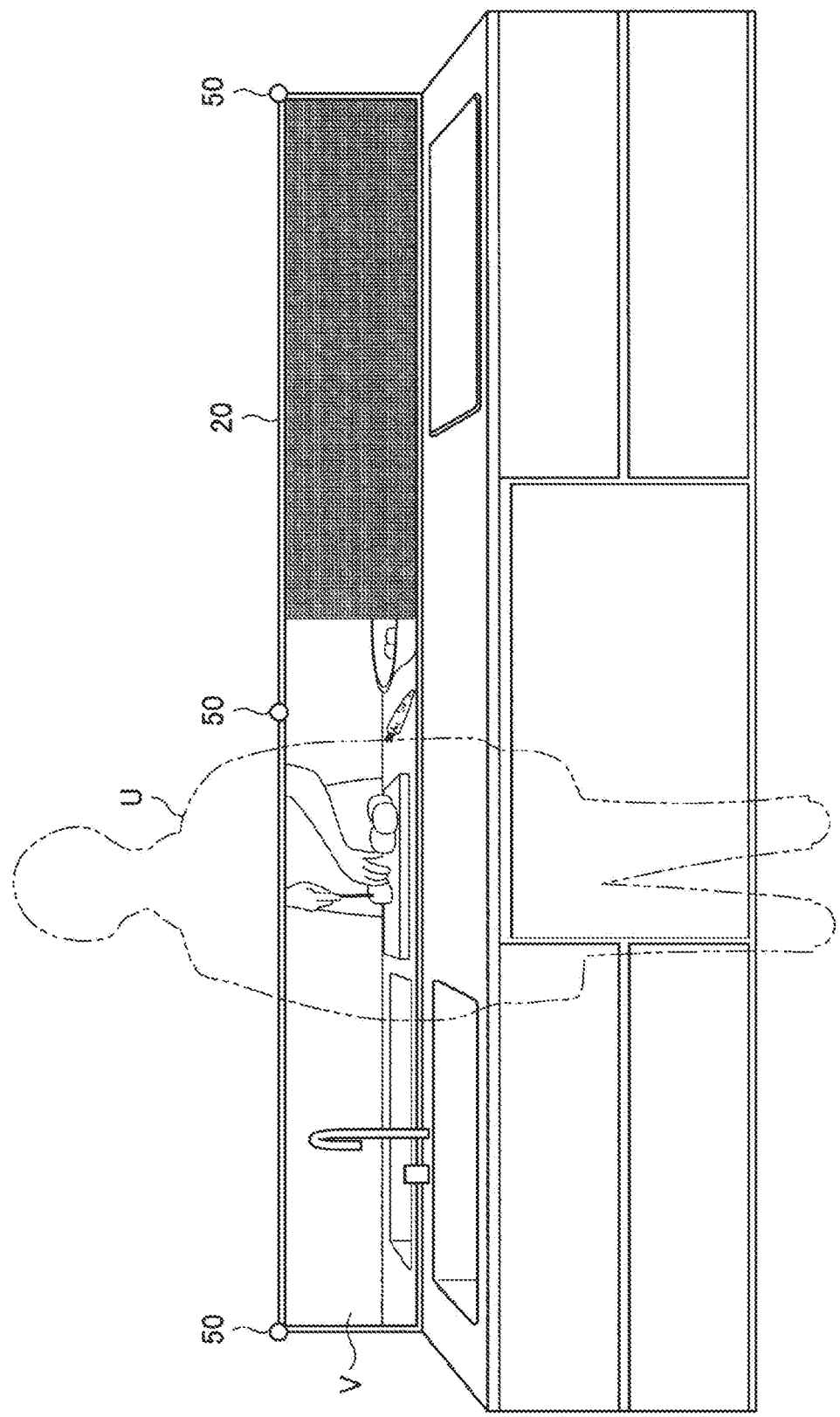
FIG. 8 is an explanatory diagram for explanation of a first modified example.
Figure 9:
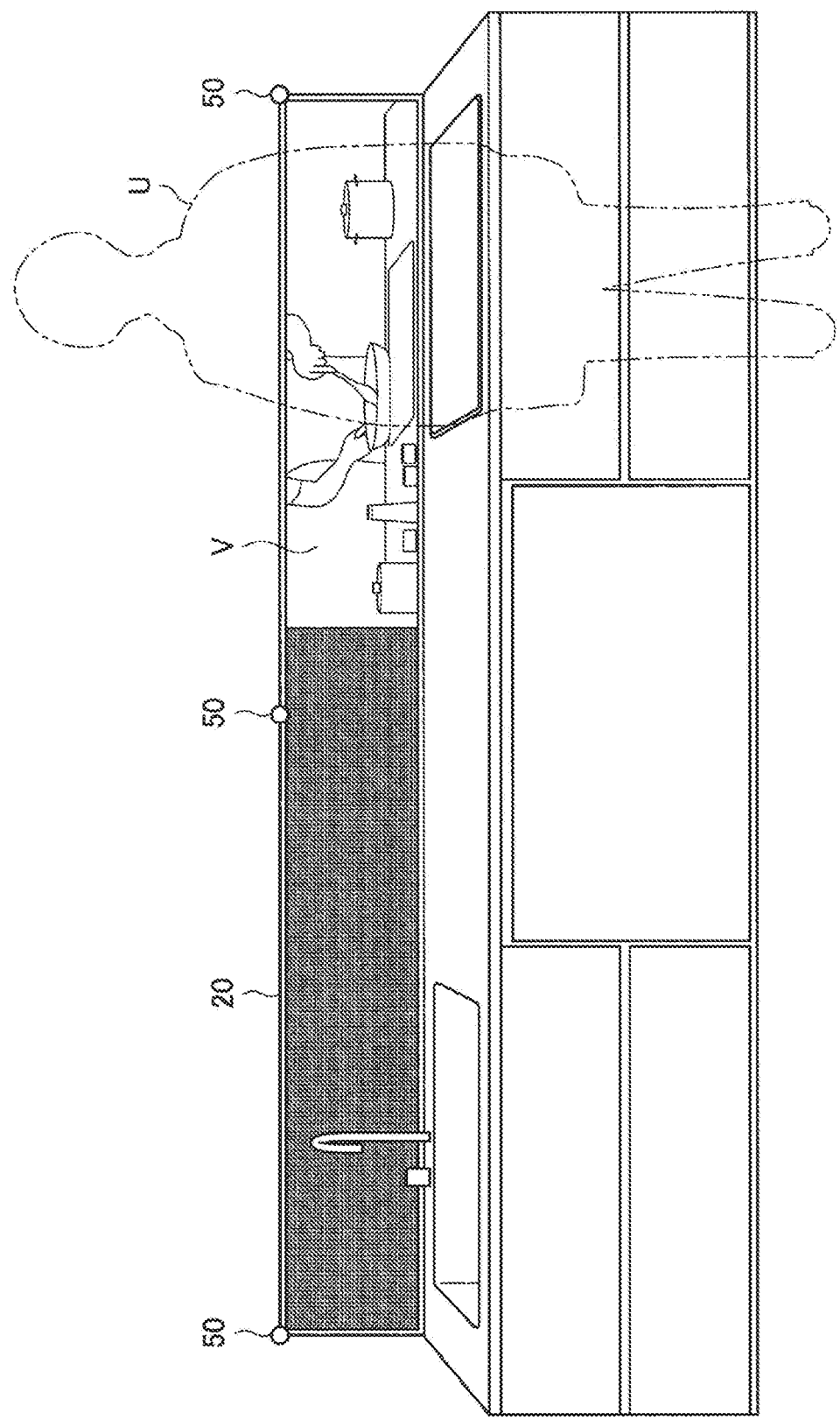
FIG. 9 is an explanatory diagram for explanation of the first modified example.

In the example described with respect to the above embodiment, the recognition unit 133 recognizes the user U's action, and replay and output are controlled based on the user U's action recognized by the recognition unit 133, but what is recognized by the recognition unit 133 is not limited to the user U's action. For example, the recognition unit 133 may recognize the user U's position, based on sensor information acquired via the interface unit 11 from the sensor device 50, and the output control unit 135 may control a display position of the model image V, based on the position of the user U. Such an example will hereinafter be described as a first modified example by reference to FIG. 8 and FIG. 9. FIG. 8 and FIG. 9 are explanatory diagrams for explanation of the first modified example.

In the example illustrated in FIG. 8 and FIG. 9, the display device 20 is provided in a backsplash portion of a kitchen, along the whole kitchen. Furthermore, in the example illustrated in FIG. 8 and FIG. 9, a plurality of the sensor devices 50 is provided in an upper portion of the display device 20 at substantially equal intervals. The recognition unit 133 included in the information processing device 10 according to this modified example and not illustrated in the drawings is capable of recognizing, not only the user U's action, but also the user U's position, based on sensor information acquired from the plurality of sensor devices 50. As long as the recognition unit 133 is capable of recognizing the user U's position, the number and arrangement of the sensor devices 50 are not limited to the example illustrated in FIG. 8 and FIG. 9.

Furthermore, the output control unit 135 included in the information processing device 10 according to the modified example and not illustrated in the drawings may move a display position of the model image V in a displayable range of the display device 20, based on a recognized position of the user U, as illustrated in FIG. 8 and FIG. 9. More desirably, the output control unit 135 may move the display position of the model image V such that a teacher in the model image V is positioned in front of the user U. According to this configuration, even if the user U moves while doing work, the teacher in the model image V is positioned in front of the user U, and thus the user U is able to watch the model image V comfortably and the user U is able to feel as if the teacher is a mirror image of the user U herself.

For the output control unit 135 to move the display position of the model image V such that the teacher in the model image V is positioned in front of the user U, information on the teacher's position in the model image V may be stored in association with the model image V beforehand in the storage unit 15. Or, by analyzing the model image V, the output control unit 135 may acquire information on the teacher's position in the model image V.

Furthermore, in the example illustrated in FIG. 8 and FIG. 9, the display position of the model image V is moved in the displayable range of the display device 20, but the modified example is not limited to this example. For example, if a plurality of the display devices 20 is arranged, the output control unit 135 may determine a display device 20 that is caused to output and replay the model image V, the determined display device 20 being a display device 20 that is present closer to the user U's position and being among the plurality of display devices 20, based on the user U's position.

4-2. Second Modified Example

In the example described with respect to the embodiment, the model image V is an image that is likely to cause the user U to feel as if a teacher in the model image V is a mirror image of the user U herself reflected in a mirror. However, even if, for example, a model image stored in the storage unit 15 is an image that is unlikely to cause the user to feel as if a teacher in the model image is a mirror image of the user U herself reflected in a mirror; output and replay after image processing, for example, enable the user U more likely to feel as if the teacher in the model image V is a mirror image of the user U herself reflected in a mirror. Such an example will be described as a second modified example below.

For example, if the dominant hand of a teacher in a model image stored in the storage unit 15 is the same as the dominant hand of a user, the user is unlikely to feel as if the teacher is a mirror image of the user herself, and it may be more difficult for the user to copy the action of the teacher. Therefore, the output control unit 135 according to the modified example may perform reverse processing on a model image along a horizontal direction thereof, if the dominant hand of a teacher in the model image is the same as the dominant hand of a user. The dominant hand of the user may be recognized by the recognition unit 133, for example.

Furthermore, if the teacher is not displayed life-sized, it may be unlikely for the user to feel as if the teacher is a mirror image of the user herself. Therefore, the output control unit 135 according to the modified example may perform enlargement or reduction processing on the model image such that the teacher is displayed life-sized, based on a size of the teacher in the model image and a screen size of the display device 20.

Furthermore, if a model image stored in the storage unit 15 includes a face region of a teacher, it may be likely for a user to recognize the teacher as a person different from the user herself. Therefore, if a face region of a teacher is included in a model image, the output control unit 135 according to this modified example may perform image processing on the model image to exclude the face region of the teacher from the model image.

The image processing on the model image to exclude the face region of the teacher from the model image may include, for example, trimming processing where a partial region of the model image is cut out to exclude the face region of the teacher from the model image. Or, the image processing to exclude the face region of the teacher from the model image may include processing of replacing the face region of the teacher in the model image with a face image of a user. The face image of the user may be acquired beforehand or may be acquired by imaging through a camera in real time. The camera may be included in the sensor device 50, for example.

Furthermore, the output control unit 135 according to the modified example may perform image processing for making a teacher in a model image more similar to a user. For example, the recognition unit 133 may recognize a clothing region of a user from an image of the user acquired by imaging with a camera, and the output control unit 135 may perform image processing on a model image, based on the recognized clothing region of the user, such that clothing of a teacher is made similar to (for example, replaced with) clothing of the user. In addition, the recognition unit 133 may recognize the gender, race, and the like of a user from an image of the user acquired by imaging with a camera, and the output control unit 135 may perform image processing on a model image, based on the recognized gender, race, and the like of the user, such that the gender, race, and the like of the user are reflected in the model image. This configuration enables the user to feel as if the teacher is a mirror image of the user herself even more.

Furthermore, based on a teacher's motion data that have been prepared in advance, the output control unit 135 may generate a model image. In this case, the output control unit 135 may generate the model image by moving, based on the teacher's motion data, a 3D model, which has been prepared in advance or generated based on a face and clothing of a user recognized from an image acquired by imaging with a camera, and which has been made similar to the user. In addition, the output control unit 135 may generate, not just the teacher, but also background of the model image, based on information on space where the user is present. This configuration enables the user to feel as if not only the teacher included in the model image, but also the whole space is a mirror image.

4-3. Third Modified Example

Furthermore, based on a difference between a user's action and a teacher's action in a model image, the output control unit 135 may perform further control of output. The difference between the user's action and the teacher's action in the model image may be a difference related to a position of a hand of a user, a position of a utensil, sizes of foodstuffs cut by the user, or the like. In addition, this difference may be recognized by, for example, the recognition unit 133. Such an example will be described as a third modified example below.

For example, the output control unit 135 may send a notification to a user based on a difference between the user's action and a teacher's action in a model image, and if, for example, the difference is large, the user may be notified of the fact that the difference is large. The method of sending a notification to the user is not particularly limited, but for example, the output control unit 135 may output sound to notify the user of the fact that the difference is large, from the speaker 30. This configuration enables the user to know that the difference between the teacher's action and the user's action is large.

In particular, if work done by a user is dangerous and the danger is increased by a difference between a teacher's action and the user's action, such a notification is more valid, and the output control unit 135 desirably causes the user to be notified of a warning. The method of notifying the user of the warning is not particularly limited, but for example, warning sound may be output from the speaker 30.

Furthermore, when a difference between a user's action and a teacher's action in a model image is large, the output control unit 135 may perform control of output to real space. The output to the real space may be implemented by, for example, projection using the lighting device 40 or a projector not illustrated in the drawings.

For example, when a difference between a user's action and a teacher's action in a model image is large, the output control unit 135 may output information related to an action and a position that are more correct, to real space. For example, an image of a hand may be displayed superimposed on a position in the real space, the position corresponding to a position of a hand of the teacher in the model image. Furthermore, if a cooking stove is switched on in the model image, an image of red light or flame may be output at a position of a cooking stove in the real space. This configuration enables the user to readily know the correct action and position.

4-4. Fourth Modified Example

In the example described above with respect to the third modified example, a user is notified of a warning when danger is increased by a difference between a teacher's action and the user's action, but in other cases also, users may be desirably notified of warnings.

For example, if a user watches a model image too carefully in work, such as cooking using a cooking knife, the user may be exposed to danger. Therefore, for example, the recognition unit 133 may recognize the user's line-of-sight, and if the user is handling the cooking knife without looking at the user's hands, the output control unit 135 may notify the user of a warning.

The method of notifying the user of the warning is not particularly limited, but for example, the user may be notified of the warning by output of warning sound from the speaker 30 or the user may be notified of the warning by output and replay of a model image where a teacher gets a cut first.

This configuration enables a user to proceed with work more safely.

5. EXAMPLE OF HARDWARE CONFIGURATION

Figure 10:
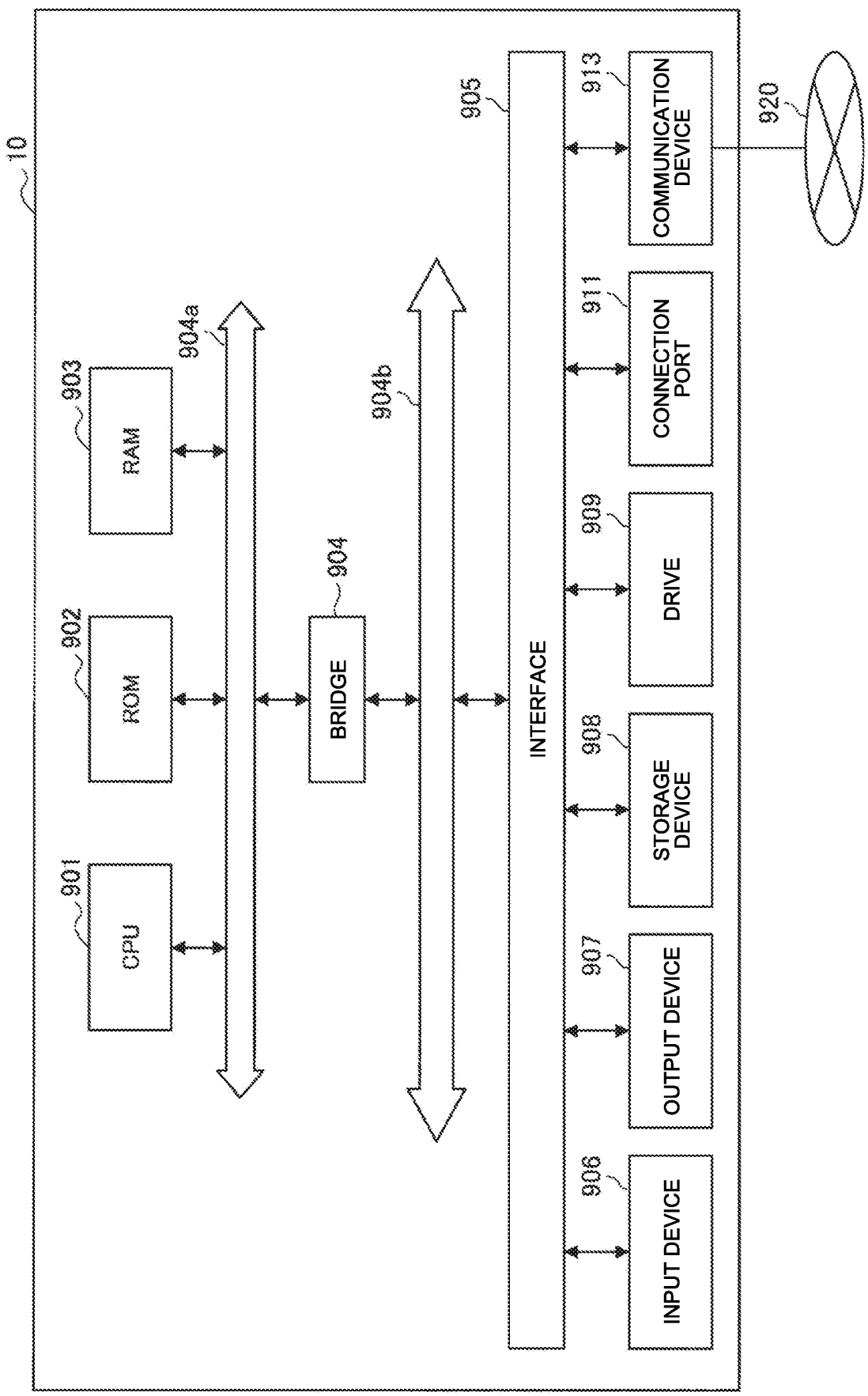
FIG. 10 is a block diagram illustrating an example of a hardware configuration of the information processing device 10 according to the embodiment of the present disclosure.

An embodiments of the present disclosure has been described above. A hardware configuration of an information processing device according to the embodiment of the present disclosure will be described lastly by reference to FIG. 10. FIG. 10 is a block diagram illustrating an example of a hardware configuration of the information processing device 10 according to the embodiment of the present disclosure. Information processing by the information processing device 10 according to the embodiment of the present disclosure is implemented by cooperation between software and hardware described below.

As illustrated in FIG. 10, the information processing device 10 includes a central processing unit (CPU) 901, a read only memory (ROM) 902, a random access memory (RAM) 903 and a host bus 904a. Furthermore, the information processing device 10 includes a bridge 904, an external bus 904b, an interface 905, an input device 906, an output device 907, a storage device 908, a drive 909, a connection port 911, a communication device 913, and a sensor 915. The information processing device 10 may have, instead of the CPU 901, or in addition to the CPU 901, a processing circuit, such as a DSP or an ASIC.

The CPU 901 functions as an arithmetic processing device and a control device, and controls the overall operation in the information processing device 10 according to various programs. Furthermore, the CPU 901 may be a microprocessor. The ROM 902 stores therein programs, arithmetic parameters, and the like, which are used by the CPU 901. The RAM 903 temporarily stores therein a program used in execution by the CPU 901, parameters that change in the execution as appropriate, and the like. The CPU 901 may form, for example, the control unit 13.

The CPU 901, the ROM 902, and the RAM 903 are connected to one another via the host bus 904a including a CPU bus or the like. The host bus 904a is connected to the external bus 904b, such as a peripheral component interconnect/interface (PCI) bus, via the bridge 904. The host bus 904a, the bridge 904, and the external bus 904b are not necessarily configured separately, and their functions may be implemented by a single bus.

The input device 906 is implemented by a device, into which information is input by a user, the device being, for example, any of: a mouse; a keyboard; a touch panel; a button or buttons; a microphone; a switch or switches; and a lever. Furthermore, the input device 906 may be, for example: a remote control device that uses infrared rays or other waves; or an externally connected device, such as a cellular phone or a PDA, which is compatible with operation of the information processing device 10. Moreover, the input device 906 may include, for example, an input control circuit that generates an input signal, based on information input by the user using the above mentioned input means, and outputs the input signal to the CPU 901. The user of the information processing device 10 is able to input various data to the information processing device 10 and instruct the information processing device 10 to perform processing and operation, by manipulating this input device 906.

The output device 907 is formed of a device that is able to visually or aurally notify the user of acquired information. Examples of such a device include: display devices, such as a CRT display device, a liquid crystal display device, a plasma display device, an EL display device, and a lamp; sound output devices, such as a speaker and headphones; and printer devices. The output device 907 outputs, for example, results acquired by various types of processing performed by the information processing device 10. Specifically, a display device visually displays the results acquired by the various types of processing performed by the information processing device 10, in various formats, such as text, image, table, and graph formats. A sound output device, on the other hand, converts an audio signal composed of replayed sound data, acoustic data, or the like, into an analog signal, and aurally outputs the analog signal.

The storage device 908 is a device for data storage, the device having been formed as an example of a storage unit of the information processing device 10. The storage device 908 is implemented by, for example: a magnetic storage device, such as an HDD; a semiconductor storage device; an optical storage device; or a magneto-optical storage device. The storage device 908 may include a storage medium, a recording device that records data into the storage medium, a reading device that reads data from the storage medium, and a deleting device that deletes data recorded in the storage medium. This storage device 908 stores therein the programs executed by the CPU 901, various data, various types of data acquired from outside, and the like. The storage device 908 may form, for example, the storage unit 15.

The drive 909 is a storage media reader-writer, and is incorporated in or provided externally to the information processing device 10. The drive 909 reads information recorded in a removable storage medium that has been inserted therein, such as a magnetic disk, an optical disk, a magneto-optical disk, or a semiconductor memory, and outputs the information to the RAM 903. Furthermore, the drive 909 is able to write information into the removable storage medium.

The connection port 911 is an interface connected to an external device, and is a connection port to the external device, to which data are able to be transmitted by, for example, a universal serial bus (USB).

The communication device 913 is a communication interface formed of, for example, a communication device for connection to a network 920. The communication device 913 is, for example, a communication card for wired or wireless local area network (LAN), long term evolution (LTE), Bluetooth (registered trademark), or wireless USB (WUSB). Furthermore, the communication device 913 may be a router for optical communication, a router for an asymmetric digital subscriber line (ADSL), a modem for any of various types of communication, or the like. This communication device 913 is able to transmit and receive signals and the like according to a predetermined protocol, for example, TCP/IP, to and from, for example, the Internet or another communication device. The communication device 913 may form, for example, the interface unit 11.

The sensor 915 is, for example, any of various sensors, such as an acceleration sensor, a gyroscope sensor, a geomagnetic sensor, an optical sensor, a sound sensor, a distance measuring sensor, and a force sensor. The sensor 915 acquires: information related to a state of the information processing device 10 itself, such as a posture and a moving speed of the information processing device 10; and information related to an environment surrounding the information processing device 10, such as brightness and noises around the information processing device 10. Furthermore, the sensor 915 may include a GPS sensor that receives a GPS signal and measures a latitude, a longitude, and an altitude of the device.

The network 920 is a wired or wireless transmission path for information transmitted from a device connected to the network 920. For example, the network 920 may include a public network, such as the Internet, a telephone network, or a satellite communication network; or any of various local area networks (LANs) and wide area networks (WANs), including Ethernet (registered trademark). Furthermore, the network 920 may include a leased line network, such as an internet protocol-virtual private network (IP-VPN).

An example of the hardware configuration that is able to implement functions of the information processing device 10 according to the embodiment of the present disclosure has been described above. Each of the above described components may be implemented using a versatile member, or may be implemented by hardware specialized for a function of that component. Therefore, a hardware configuration to be used may be modified, as appropriate, according to a technical level at the time the embodiment of the present disclosure is implemented.

A computer program for implementing the functions of the information processing device 10 according to the embodiment of the present disclosure as described above may be made and installed on a PC or the like. Furthermore, a computer-readable recording medium having such a computer program stored therein may also be provided. The recording medium is, for example, a magnetic disk, an optical disk, a magneto-optical disk, or a flash memory. In addition, without using a recording medium, the above described computer program may be distributed via, for example, a network.

6. CONCLUSION

As described above, according to the embodiment of the present disclosure, controlling, dependently on a user's action, output and replay of a model image enables the user to proceed with work more comfortably. Furthermore, according to the embodiment of the present disclosure, the user is able to feel as if a teacher in the model image is a mirror image of the user herself, and the user is thus able to practice work as if the user is looking at a mirror. As a result, the user's skill related to the work, for example, is able to be improved.

A preferred embodiment of the present disclosure has been described in detail above by reference to the appended drawings, but the technical scope of the present disclosure is not limited to this example. It is evident that a person having ordinary skill in the technical field of the present disclosure can derive various modified examples or corrected examples within the scope of the technical ideas written in the claims, and it is understood that these modified examples or corrected examples also rightfully belong to the technical scope of the present disclosure.

For example, the steps according to the above described embodiment are not necessarily processed chronologically along the order written in the flow chart. For example, the steps in the processing according to the above described embodiment may be processed in order different from the order illustrated in the flow chart, or may be processed parallelly.

Furthermore, the effects described in this specification are just explanatory or exemplary, and are not limiting. That is, the techniques according to the present disclosure may achieve other effects evident to those skilled in the art from the description in this specification, in addition to the above described effects or instead of the above described effects.

The following configurations also belong to the technical scope of the present disclosure.

(1)
An information processing device, comprising:
a mode control unit that determines a replay mode from replay mode candidates including: a user dependent mode where output and replay are performed dependently on a user's action; and a user independent mode where output and replay are performed independently of the user's action; and
an output control unit that controls replay and output of an image, based on the replay mode.

(2)
The information processing device according to (1), wherein the output control unit controls the output and replay of the image, based on taught action information related to a teacher's action in the image and the user's action, when the replay mode is the user dependent mode.

(3)
The information processing device according to (2), further comprising:
a recognition unit that recognizes the user's action, wherein
the output control unit stops the replay and output of the image until a predetermined action performed by the teacher in the image is recognized by the recognition unit.

(4)
The information processing device according to (2) or (3), wherein the output control unit causes the image to be replayed and output such that the teacher's action precedes the user's action.

(5)
The information processing device according to (4), wherein the output control unit causes the image to be replayed and output such that the teacher's action precedes the user's action by a given time period.

(6)
The information processing device according to (4), wherein the output control unit causes the image to be replayed and output such that the teacher's action precedes the user's action more as time elapses.

(7)
The information processing device according to (4), wherein the output control unit causes the image to be replayed and output such that the teacher's action and the user's action match each other at a start time and an end time of an action.

(8)
The information processing device according to (7), wherein the output control unit causes the image to be replayed and output according to progress of the user's action.

(9)
The information processing device according to (4), wherein the output control unit causes the image to be replayed and output such that the teacher's action is delayed from the user's action.

(10)
The information processing device according to (4) or any one of 7 to (9), wherein the output control unit causes the image to be replayed and output such that temporal difference between the teacher's action and the user's action decreases every time the same action is repeated.

(11)
The information processing device according to (2) or (3), wherein the output control unit causes the image to be replayed and output such that the teacher's action and the user's action are in synchronization with each other.

(12)
The information processing device according to any one of (2) to (11), wherein the output control unit performs image processing on the image, according to a dominant hand of the user and a dominant hand of the teacher in the image.

(13)
The information processing device according to any one of (2) to (12), wherein the output control unit performs image processing such that a face region of the teacher is excluded from the image, if the face region of the teacher is included in the image.

(14)
The information processing device according to any one of (2) to (13), wherein the output control unit performs further control of output, based on a difference between the user's action and the teacher's action in the image.

(15)
The information processing device according to any one of (1) to (14), wherein the output control unit controls a display position of the image, according to a position of the user.

(16)
The information processing device according to any one of (1) to (15), wherein the output control unit causes the user to be notified of the replay mode.

(17)
The information processing device according to any one of (1) to (16), wherein the user's action is action related to work performed by the user.

(18)
An information processing method, including:
determining a replay mode from replay mode candidates including: a user dependent mode where output and replay are performed dependently on a user's action; and a user independent mode where output and replay are performed independently of the user's action; and
controlling output and replay of an image, based on the replay mode.

(19)
A program for causing a computer to implement:
a function of determining a replay mode from replay mode candidates including: a user dependent mode where replay and output are performed dependently on a user's action; and a user independent mode where replay and output are performed independently of the user's action; and a function of controlling output and replay of an image, based on the replay mode.

REFERENCE SIGNS LIST

10 INFORMATION PROCESSING DEVICE
11 INTERFACE UNIT
13 CONTROL UNIT
15 STORAGE UNIT
20 DISPLAY DEVICE
30 SPEAKER
40 LIGHTING DEVICE
50 SENSOR DEVICE
131 MODE CONTROL UNIT
133 RECOGNITION UNIT
135 OUTPUT CONTROL UNIT
1000 DISPLAY SYSTEM

The invention claimed is:

1. An information processing device, comprising:
a mode control unit configured to:
determine a replay mode from a plurality of replay mode candidates based on a frame of an image, wherein
the plurality of replay mode candidates includes:
a user dependent mode where output of the image and replay of the image are dependent on an action of a user; and
a user independent mode where the output and the replay are independent of the action of the user;
an output control unit configured to control the replay and the output of the image based on the determined replay mode that corresponds to the user independent mode, wherein
the mode control unit is further configured to:
determine the frame corresponds to a specific scene; and
switch the replay mode to the user dependent mode based on the determination that the frame corresponds to the specific scene, and
the output control unit is further configured to stop the replay and the output of the image based on the switch of the replay mode; and
a recognition unit configured to recognize the action of the user, wherein
the output control unit is further configured to restart the replay and the output of the image based on the recognized action of the user.

2. The information processing device according to claim 1, wherein
the output control unit is further configured to control the output and the replay of the image based on taught action information and the recognized action of the user in the user dependent mode, and
the taught action information corresponds to an action of a teacher in the image.

3. The information processing device according to claim 2, wherein
the recognized action of the user corresponds to the action of the teacher in the image.

4. The information processing device according to claim 2, wherein the output control unit is further configured to control the replay and the output of the image such that the action of the teacher precedes the action of the user.

5. The information processing device according to claim 4, wherein the output control unit is further configured to control the replay and the output of the image such that the action of the teacher precedes the action of the user by a specific time period.

6. The information processing device according to claim 4, wherein the output control unit is further configured to control the replay and the output of the image such that the action of the teacher precedes the action of the user more based on elapse of a specific time.

7. The information processing device according to claim 4, wherein the output control unit is further configured to control the replay and the output of the image such that the action of the teacher matches the action of the user at a start time of a specific action and an end time of the specific action.

8. The information processing device according to claim 7, wherein the output control unit is further configured to control the replay and the output of the image based on a to progress of the action of the user.

9. The information processing device according to claim 4, wherein the output control unit is further configured to control the replay and the output of the image such that temporal difference between the action of the teacher and the action of the user is decreased based on repetition of a same action.

10. The information processing device according to claim 2, wherein the output control unit is further configured to control the replay and the output of the image such that the action of the teacher is delayed from the action of the user.

11. The information processing device according to claim 2, wherein the output control unit is further configured to control the replay and the output of the image such that the action of the teacher is in synchronization with the action of the user.

12. The information processing device according to claim 2, wherein the output control unit is further configured to perform image processing on the image based on a dominant hand of the user and a dominant hand of the teacher in the image.

13. The information processing device according to claim 2, wherein
the output control unit is further configured to perform image processing on the image to exclude a face region of the teacher from the image, and
the image processing is performed based on the face region of the teacher that is included in the image.

14. The information processing device according to claim 2, wherein the output control unit is further configured to control the output based on a difference between the action of the user and the action of the teacher in the image.

15. The information processing device according to claim 1, wherein the output control unit is further configured to control a display position of the image based on a position of the user.

16. The information processing device according to claim 1, wherein the output control unit is further configured to notify the user of the replay mode.

17. The information processing device according to claim 1, wherein the action of the user is related to work performed by the user.

18. An information processing method, comprising:
in an information processing device:
determining, by a mode control unit of the information processing device, a replay mode from a plurality of replay mode candidates based on a frame of an image, wherein the plurality of replay mode candidates includes:
- a user dependent mode where output of the image and replay of the image are dependent on an action of a user; and
- a user independent mode where the output and the replay are independent of the action of the user;

controlling, by an output control unit of the information processing device, the output and the replay of the image based on the determined replay mode that corresponds to the user independent mode;

determining, by the mode control unit of the information processing device, the frame corresponds to a specific scene;

switching, by the mode control unit of the information processing device, the replay mode to the user dependent mode based on the determination that the frame corresponds to the specific scene;

stopping, by the output control unit of the information processing device, the replay and the output of the image based on the switch of the replay mode;

recognizing, by a recognition unit of the information processing device, the action of the user; and restarting, by the output control unit of the information processing device, the replay and the output of the image based on the recognized action of the user.

19. A non-transitory computer-readable medium having stored thereon computer-executable instructions which, when executed by a computer, cause the computer to execute operations, the operations comprising:

determining a replay mode from a plurality of replay mode candidates based on a frame of an image, wherein the plurality of replay mode candidates includes:
- a user dependent mode where replay of the image and output of the image are dependent on an action of a user; and
- a user independent mode where the replay and the output are independent of the action of the user;

controlling the output and the replay of the image based on the determined replay mode that corresponds to the user independent mode;

determining the frame corresponds to a specific scene;

switching the replay mode to the user dependent mode based on the determination that the frame corresponds to the specific scene;

stopping the replay and the output of the image based on the switch of the replay mode;

recognizing the action of the user; and restarting the replay and the output of the image based on the recognized action of the user.

* * * * *